United States Patent
Nakagawara et al.

(10) Patent No.: US 8,880,260 B2
(45) Date of Patent: Nov. 4, 2014

(54) CONTROL DEVICE FOR USE IN VEHICLE, ADAPTED TO CONTROL SAFETY MEASURES AGAINST ELECTRIC POWER SUPPLY FAILURE

(75) Inventors: Hidemitsu Nakagawara, Yokohama (JP); Hisahiro Nabeshima, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/698,381

(22) PCT Filed: Apr. 20, 2011

(86) PCT No.: PCT/JP2011/059705
§ 371 (c)(1),
(2), (4) Date: Nov. 16, 2012

(87) PCT Pub. No.: WO2011/145423
PCT Pub. Date: Nov. 24, 2011

(65) Prior Publication Data
US 2013/0060412 A1    Mar. 7, 2013

(30) Foreign Application Priority Data
May 17, 2010  (JP) ................. 2010-112961

(51) Int. Cl.
*B60L 9/00*   (2006.01)
*B60T 1/06*   (2006.01)
*B60T 1/00*   (2006.01)
*B60T 8/88*   (2006.01)
*F16H 63/34*  (2006.01)
*B60T 17/22*  (2006.01)
*F16H 61/12*  (2010.01)

(52) U.S. Cl.
CPC ........... *B60T 1/005* (2013.01); *B60T 1/062* (2013.01); *F16H 2061/1292* (2013.01); *F16H 61/12* (2013.01); *B60T 8/885* (2013.01); *B60T 2270/414* (2013.01); *F16H 63/3458* (2013.01); *B60T 17/221* (2013.01)
USPC .......................................................... 701/22

(58) Field of Classification Search
USPC .................................................. 701/22, 148
See application file for complete search history.

(56) References Cited

U.S. PATENT DOCUMENTS

| 7,966,903 | B2 | 6/2011 | Kimura et al. | |
| 2009/0326767 | A1* | 12/2009 | Kamada et al. | 701/48 |

FOREIGN PATENT DOCUMENTS

| JP | 5-280637 A | 10/1993 |
| JP | 8-216844 A | 8/1996 |
| JP | 2001-271917 A | 10/2001 |
| JP | 2008-304010 A | 12/2008 |
| JP | 2010-214976 A | 9/2010 |

* cited by examiner

Primary Examiner — James Trammell
Assistant Examiner — Michael D Lang
(74) Attorney, Agent, or Firm — Foley & Lardner LLP

(57) ABSTRACT

A vehicular power supply failure time safety measures control apparatus for a vehicle equipped with an electric park lock mechanism includes a means to detect a power supply failure in a park lock power supply, and a means to examine an electric storage state of the park lock power supply after the time of the power supply failure. The control apparatus further includes a park lock means to lock rotation of the wheel by operating the park lock mechanism when the electric storage state of the park lock power supply approaches a lower limit of the electric storage state ensuring the operation of the park lock mechanism.

16 Claims, 5 Drawing Sheets

FIG.4

| | FIRST PHASE<br>POWER SUPPLY FAILURE-10.5 V<br>140-80 km/h | SECOND PHASE<br>10.5-9 V<br>80-0 km/h | THIRD PHASE<br>9V-8.7 V<br>10-0 km/h | FOURTH PHASE<br>LOWER THAN 8.7 V<br>5-0 km/h |
|---|---|---|---|---|
| WHEEL DRIVING FORCE | VEHICLE SPEED LIMITATION 100-10 km/h | DRIVING FORCE CUT | DRIVING FORCE CUT | DRIVING FORCE CUT |
| WARNING LIGHT | WARNING LIGHT ON | WARNING LIGHT ON | WARNING LIGHT OFF | WARNING LIGHT OFF |
| WARNING MESSAGE | MESSAGE (STOPPING) INDICATION | MESSAGE (STOPPING · PARKING) INDICATION | METER BLACK OUT | METER BLACK OUT |
| BUZZER | CONTINUOUS SOUNDING | CONTINUOUS SOUNDING | CONTINUOUS SOUNDING | LOWER SOUND PRESSURE |
| BRAKING FORCE/ OPERATIONAL FORCE ASSIST | NORMAL OPERATION | ASSIST FORCE LOWERED GRADUALLY | ASSIST FORCE LOST | ASSIST FORCE LOST |
| AUTOMATIC PARK LOCK | NONE | NONE | NONE | PARK LOCK ACTIVATED AUTOMATICALLY |

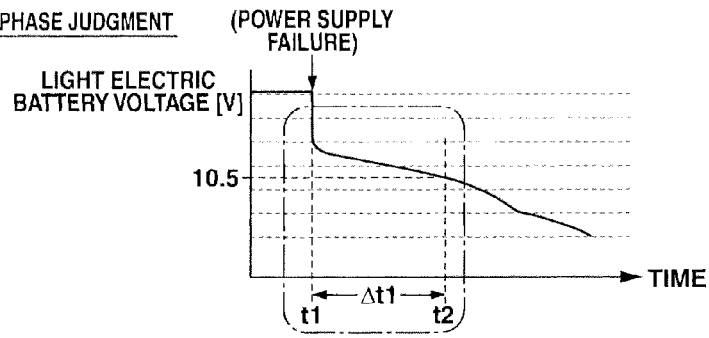
FIG.5A FIRST PHASE JUDGMENT
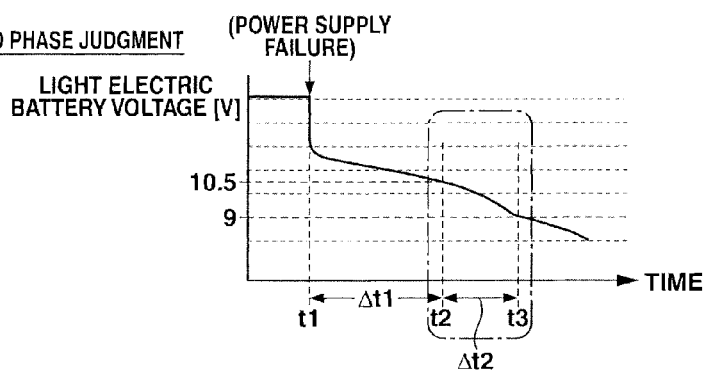
FIG.5B SECOND PHASE JUDGMENT
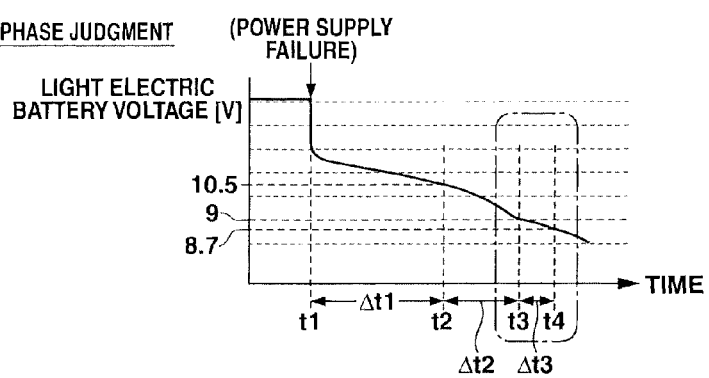
FIG.5C THIRD PHASE JUDGMENT
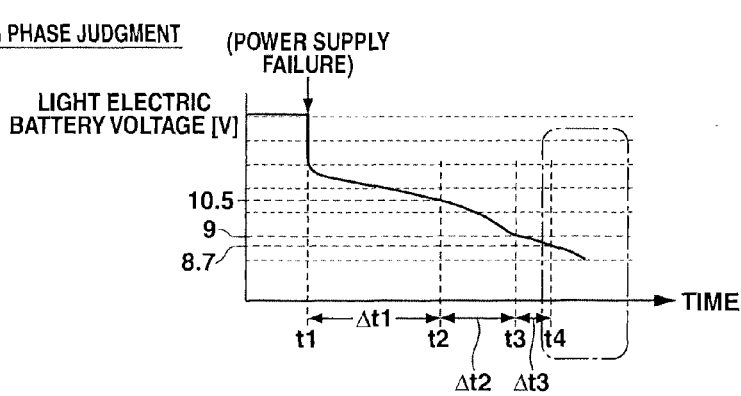
FIG.5D FOURTH PHASE JUDGMENT

CONTROL DEVICE FOR USE IN VEHICLE, ADAPTED TO CONTROL SAFETY MEASURES AGAINST ELECTRIC POWER SUPPLY FAILURE

TECHNICAL FIELD

The present invention relates to a vehicular power supply failure time safety measures control device or apparatus to operate a park lock device safely even at the time of electric power supply failure, in a vehicle such as an electric vehicle, a hybrid vehicle or an electrically operated vehicle using an electric motor as at least part of a power source.

BACKGROUND ART

In the case of a vehicle equipped with a manual transmission, the vehicle is normally parked to hold the vehicle immovable with a combined application of the transmission shifted to a lower speed such as the first speed to lock the rotation of drive wheels, and a parking brake.

In the case of an electric vehicle and a vehicle equipped with an automatic transmission, the above-mentioned method for the rotation lock of the drive wheels at the time of parking is not feasible. Therefore, there is provided a park lock device for the rotation lock of the drive wheels. During parking, the vehicle is held immovable by application of the park lock device and the parking brake.

As the park lock device, there has been recently proposed, and employed in some vehicles, a so-called by-wire control type park lock device which has a construction to operate a park lock mechanism with a park lock actuator such as a motor, and which is arranged to convert a parking command generated by a driver's shift operation, into an electric signal and to operate the actuator in accord with the electric parking command.

In the case of the electric vehicle, the by-wire control type park lock device is indispensable in relation to the control system of the entire vehicle.

In such a by-wire control type park lock device, a power supply or power source is essential to operate a park lock actuator, and to drive a controller for controlling the park lock actuator.

Therefore, at the time of power supply failure such as inability of charging the power supply of the park lock device, or inability or malfunction of charging sufficiently, the electric storage state of the park lock power supply becomes worse gradually. Consequently, the park lock device becomes unable to be operated properly in time, and the driver is obliged to park the vehicle in the state without the rotation lock, to the disadvantage of the safety.

As is often the case with the electric vehicle, in the case of an electric parking brake arranged to be operated through an actuator by driver's operation of a nearby switch, unlike a mechanical parking brake operated by the driver mechanically, the electric power source is shared by the electric parking brake and the park lock device in a common-sense arrangement. Therefore, there arises a problem that it becomes impossible to set the vehicle in the parking state since the parking brake becomes inoperative simultaneously at the time of an inoperative state of the park lock device.

Therefore, at the time of a failure of the park lock power supply, there is a demand for finish operation of the park lock device at least before the park lock power supply falls in a state unable to operate the park lock device. However, the inventors of this application are not aware of technique to fulfill this demand.

A patent document 1 shows a following proposal of a countermeasure technique to an abnormal condition in a shift range changeover device. In the case of occurrence of an abnormal condition in a shaft range changing drive system in a by-wire control type shift range changeover device for an automatic transmission, the technique of this patent document proposes to inhibit an electric current control to the shift range changeover drive system in the abnormal state and to operate the shaft range changeover mechanism only with a torque produced by supplying electric current to a shift range changing drive system remaining in the normal state free of an abnormality.

However, the abnormal time countermeasure technique disclosed in the patent document 1 is not a measure against a failure in an electric power supply, but a measure against a failure in the drive system. Therefore, the technique of the patent document 1 is not effective as measures against a failure in a park lock power supply treated by this invention.

If the concept of the abnormal time countermeasure technique of the patent document 1 were used for measures against a failure in the park lock power supply treated by the present invention, a resulting system would be constructed to have two park lock power supply systems having two park lock power supplies, respectively, and to operate the park lock device by inhibiting the supply of power from the park lock power supply involving an abnormal condition and supplying electric power only from the park lock power supply in the normal state free from abnormality.

The arrangement including two of the park lock power supplies and forming two of the park lock power supply systems is capable of operating the park lock device with a normal one of the two park lock power supply systems even if one of the two park lock power supply systems fails. However, this arrangement increases the cost, specifically because of the cost of the costly park lock power supplies.

PRIOR ART LITERATURE

Patent Document(s)

Patent Document 1: JP2001-271917 A

SUMMARY OF THE INVENTION

From the viewpoint that, at the time of a power supply failure in which the power supply of the park lock device becomes unable to perform an electric charging operation at all or unable to perform the electric charging operation sufficiently, the electric storage state of the park lock power supply is not brought immediately to a level unable to operate the park lock device, it is an object of the present invention to propose a vehicular power supply failure time safety measures control apparatus or system to make it possible to bring the vehicle to a parking state with the park lock device even at the time of a failure in the park lock power supply, by operating the park lock device with this power supply before the electric storage state is decreased to the level unable to operate the park lock device, and thereby to avoid the parking inability at the time of a power supply failure, only with inexpensive measures on the control.

For this object, the vehicular power supply failure time safety measures control apparatus according to the present invention is constructed in the following manner. First, a vehicle underlying the present invention is a vehicle equipped with an electric type park lock mechanism to lock the rotation of a wheel or wheels of the vehicle.

For such a vehicle, the vehicular power supply failure time safety measures control apparatus according to the present invention is characterized by a following construction comprising a power supply failure detecting means, device or section, an electric storage state judging or examining means, device or section and a park lock means, device or section.

The power supply failure detecting means detects a condition in which a park lock power supply of the park lock mechanism falls in charge inability or a charge malfunction. The electric storage state examining or judging means judges the electric storage state of the park lock power supply on and after the time of detection of the power supply failure by the power supply failure detecting means. The park lock means locks the rotation of the wheel(s) by operating the park lock mechanism, under a vehicle speed condition allowing rotation lock of the wheel with the park lock mechanism, when the electric storage state of the park lock power supply judged by the electric storage state examining means approaches a lower limit of the electric storage state ensuring the operation of the park lock mechanism.

The thus-constructed vehicular power supply failure time safety measures control apparatus or system locks the rotation of the wheel(s) by operating the park lock mechanism under the vehicle speed condition allowing the rotation lock of the wheel with the park lock mechanism when the electric storage state of the park lock power supply on and after the time of the power supply failure of charge inability or charge malfunction of the park lock power supply approaches, or becomes closer to, the lower limit of the electric storage state ensuring the operation of the park lock mechanism. Therefore, in the case of a charging failure of the park lock power supply causing the electric storage state of the park lock power supply to lower to a low level unable to operate the park lock mechanism, this control apparatus can complete the operation of the park lock device by using the park lock power supply in the electric storage state before the lowering to the low level, and thereby set the vehicle in the parking state with the park lock mechanism even at the time of the park lock power supply failure, to avoid the situation disabling the parking operation at the time of the park lock power supply failure.

Moreover, the vehicular power supply failure time safety measures control apparatus according to the present invention can achieve the above-mentioned operations and effects to avoid the parking disabling state at the time of power supply failure, inexpensively without the need for employing two power supply systems including the park lock power supply or supplies, only by employing measures, on the control, of a power supply failure such as charge inability or charge malfunction in the park lock power supply; that is, by examining or judging the electric storage state of the park lock power supply at and after the time of the power supply failure; and operating the park lock mechanism under the vehicle speed condition allowing the wheel rotation lock with the park lock mechanism when this electric storage state approaches the lower voltage limit ensuring the operation of the park lock mechanism.

BRIEF DESCRIPTION OF THE DRAWINGS

FIG. 4 is a view for illustrating logic of the power supply failure time safety measures control shown in FIG. 3.

FIGS. 5A~5D are time charts showing decreasing behavior of a voltage of a light electric battery shown in FIG. 1 after the time of a power supply failure. FIG. 5A is a time chart used for illustrating the judgment of a first phase. FIG. 5B is a time chart used for illustrating the judgment of a second phase. FIG. 5C is a time chart used for illustrating the judgment of a third phase. FIG. 5D is a time chart used for illustrating the judgment of a fourth phase.

MODE(S) FOR CARRYING OUT THE INVENTION

Figure 1:
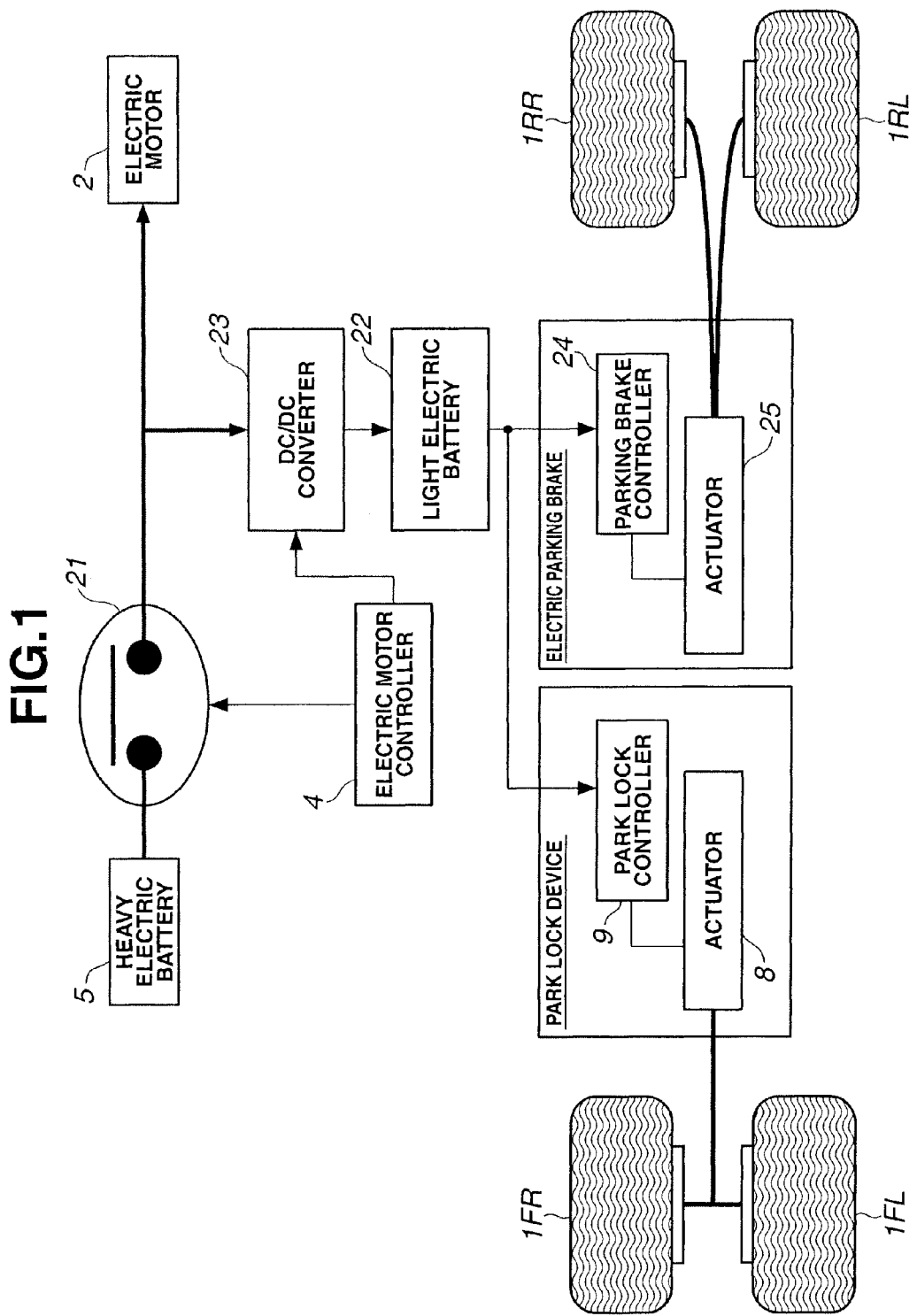
FIG. 1 is a schematic system view showing an electric power system of a vehicle equipped with a power supply failure time safety measures control apparatus or system according to one embodiment of the present invention.

Following is detailed explanation on embodiment(s) of the present invention illustrated in the drawings.
<Construction>

Figure 2:
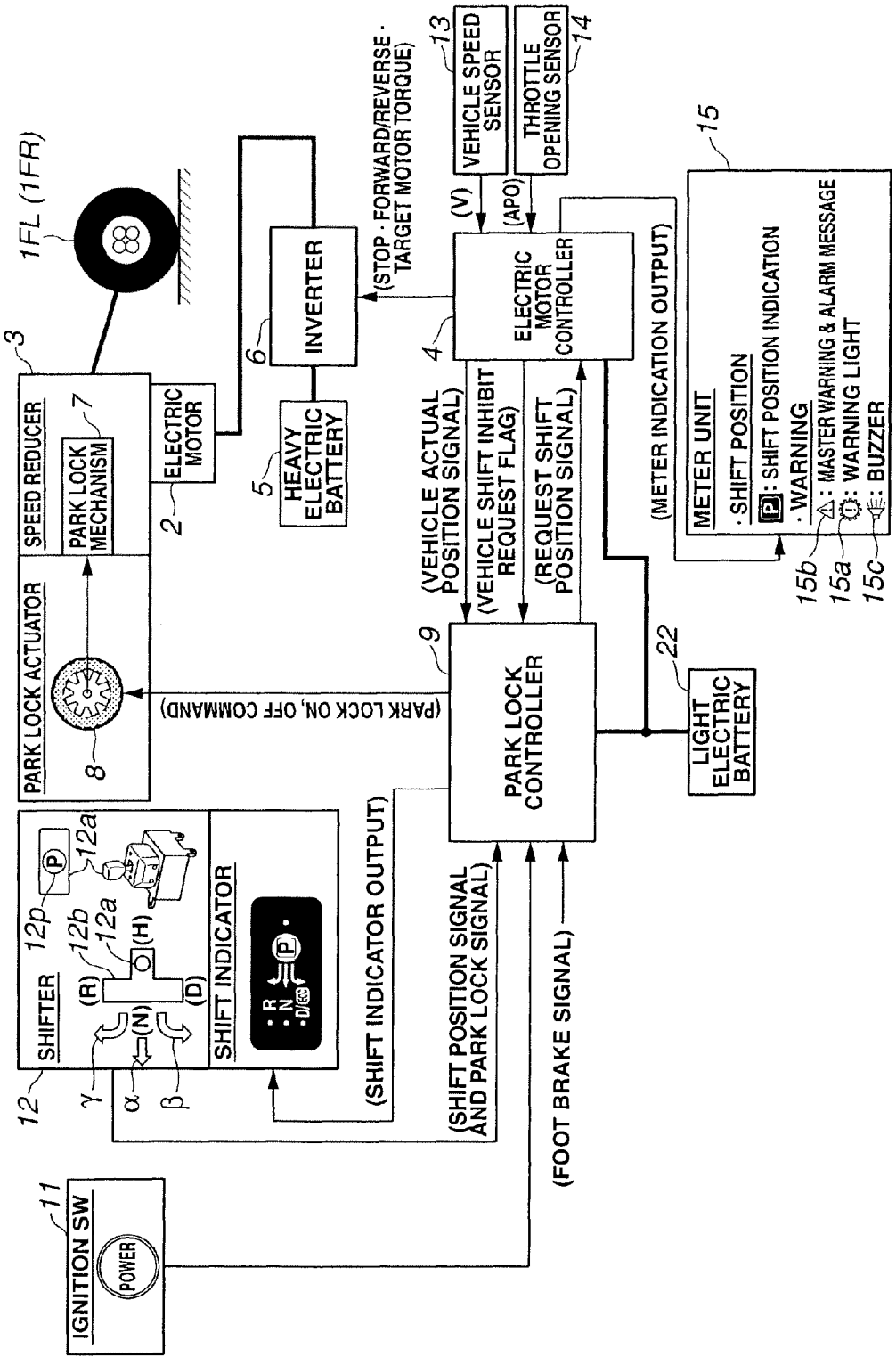
FIG. 2 is a schematic system view showing a drive system and its control system of the vehicle shown in FIG. 1.

FIG. 1 shows an electric power system of a vehicle equipped with a power supply failure time safety measures control apparatus or system according to one embodiment of the present invention. FIG. 2 shows a drive system and its control system of the vehicle. The drive system and the control system constitute a vehicle driving system.

The vehicle of this embodiment provided with the power system shown in FIG. 1 and the vehicle driving system shown in FIG. 2 is an electric vehicle propelled by an electric motor 2 driving left and right front wheels (left and right drive wheels) 1FL and 1FR. As shown in FIG. 2, left and right front wheels 1FL and 1FR are driven by electric motor 2 through a speed reducer 3 (including a differential gear unit).

Electric motor 2 is controlled by an electric motor controller 4. As shown in FIG. 2, the electric motor controller 4 converts the power of a high voltage power source in the form of a heavy electric battery 5 from DC to AC with an inverter 6 and supplies the AC power to electric motor 2 under the control with inverter 6. By so doing, electric motor controller 4 controls the electric motor 2 so that the torque of electric motor 2 becomes equal to a calculation result of electric motor controller 4 (a target motor torque inclusive of zero at the time of stop and a motor rotational direction for the forward and reverse movement). The heavy electric battery 5 is designed to be charged by power from an external power source or replaced by another battery in a fully charged state when the state of electric storage becomes lower.

When the calculation result (the target motor torque) at electric motor controller 4 is negative in polarity so as to require a regenerative braking operation of electric motor 2, the electric motor controller 4 imposes a generation load on electric motor 2 through inverter 6 and charges power generated by the regenerative braking operation of electric motor 2, into battery 5 after AC-DC conversion with inverter 6.

In this embodiment, a park lock device is added to the vehicle driving system, as shown in FIG. 2. Accordingly, the speed reduce 3 has therein a park lock mechanism 7 to lock the left and right front wheels 1FL and 1RL against rotation. Though not shown in detail, this park lock mechanism 7 is of a type similar to a park lock mechanism used in an automatic transmission.

Namely, park lock mechanism 7 includes a parking gear provided to rotate with left and right front wheels 1FL and 1FR, a parking pole pivotally supported on a case of speed reducer 3, and a park rod interposed between the parking pole and a reaction receiving member, to swing the parking pole urged by a spring force in a direction away from the parking gear, in a direction toward the parking gear.

The rotation lock (park lock) of left and right front wheels 1FL and 1FR is achieved by pushing the park rod to make inward stroke, and thereby causing the parking pole to swing toward the parking gear by a cam operation with a conical cam formed integrally in the park rod, the parking pole and the reaction receiving member, and thereby engaging a forward pawl of the parking pole with teeth of the parking gear.

The above-mentioned pushing inward stroke and a pulling outward stroke in the opposite direction, of the park rod are achieved by an electric park lock actuator 8. Park lock actuator 8 is operated in response to a park lock on/off command delivered from a park lock controller 9.

The park lock device of FIG. 2 is a device of an electronic control type (by-wire control type) different from a mechanical type used in an automatic transmission.

Next is explanation based on FIG. 1, about the power system of electric motor 2, and the power system of the park lock device including park lock actuator 8 and park lock controller 9.

Electric motor 2 is connected through a power switch 21 with the heavy electric battery 15. In FIG. 1, inverter 6 shown in FIG. 2 is omitted for the sake of simplification. Power switch 21 is opened and closed by electric motor controller 4. Electric motor controller 4 turns on the power switch 21 to bring the vehicle driving system shown in FIG. 2 into an activated state, and turns off the power switch 21 to bring the vehicle driving system of FIG. 2 into a non-activated state.

The power system of the park lock device including park lock actuator 8 and park lock controller 9 includes a low voltage power source in the form of light electric battery of 14V, for example.

By receiving power supply from this light electric battery 22, the park lock controller 9 and park lock actuator 8 operate to achieve the park lock of left and right front wheels 1FL and 1FR through the park lock mechanism (cf. FIG. 2), as required.

Accordingly, the light electric battery 22 serves as a park lock power supply in the present invention.

Light electric battery 22 is connected through a DC/DC converter 23, with a heavy electric circuit between the power switch 21 and the electric motor 2. While power switch 21 is in the ON state, the electric motor controller 4 controls the operation of DC/DC converter 23 and thereby charges the light electric battery 22 with power from heavy electric battery 5 to hold the light electric battery 22 in the adequate electric storage state.

The electric vehicle in this embodiment is equipped with an electric parking brake including a parking brake controller 24 and a parking brake actuator 25, as shown in FIG. 1. This electric parking brake is operated with power from light electric battery 22 to bring the left and right rear wheels 1RL and 1RR in a friction braking state.

The electric parking brake is provided with a parking switch (not shown) adapted to be pressed by the driver and to deliver an electric parking on/off command to the parking brake controller 24.

At the time of the parking ON command, the parking brake controller 24 brings the left and right rear wheels 1RL and 1 RR into the friction braking state by operating the parking brake actuator 25 in one direction with electric power from weak electric battery 22.

At the time of the parking OFF command, the parking brake controller 24 cancels the friction braking state of left and right rear wheels 1RL and 1RR by operating the parking brake actuator 25 in the opposite direction with electric power from weak electric battery 22.

In order to produce the above-mentioned park lock on/off command, the park lock controller 9 is arranged, as shown in FIG. 2, to receive: a foot brake signal indicating whether a foot brake operation of depressing a brake pedal is in progress or not; a signal from an ignition switch 11 (switched between an ON state and an OFF state each time the ignition switch is pressed) to be pressed to bring the vehicle driving system of FIG. 2 into the activated state or to bring the vehicle driving system into the non-activated state; and shift position signal and park lock signal from a shifter 12 to be operated by the driver to command a desired vehicle driving mode (including stoppage and parking).

When a start request to start the vehicle driving system is produced by a turn on of ignition switch 11, the park lock controller 9 delivers this start request as a request shift position signal to electric motor controller 4. In response to this signal, electric motor controller 4 brings the power system of FIG. 1 into a closed state by turning on the power switch 21.

Shifter 12 includes an operating member 12a normally held at a home (H) position as a reference position. By operating this operating member 12a, the driver can command the desired driving mode (stoppage, forward and reverse). Moreover, by pressing a park lock switch 12p of a self-return push bottom type provided in a top surface of operating member 12a, the driver can command the park lock. For the above-mentioned operation of operating member 12a, the driver moves the operating member 12a along a T-shaped shift pattern 12b. In response to the shifting movement of operating member 12a along the shift pattern 12b, and the pressing operation of park lock switch 12p, the shifter 12 functions in a following manner.

When the driver wishes to park the vehicle, and operates the park lock switch 12p on operating member 12a located at the home (H) position, by pressing and releasing the park lock switch 12p, then the shifter 12 instantly delivers the park lock signal to park lock controller 9. At this time, park lock controller 9 examines a vehicle shift inhibit request flag from electric motor controller 4 and thereby checks whether a parking inhibit request for parking inhibition or prohibition is produced by electric motor controller 4.

In the case of a state allowing parking of the vehicle with no parking inhibit request, the park lock controller 9 delivers the park lock on signal to park lock actuator 8 in response to the above-mentioned park lock signal from shifter 12. In response to the park lock on signal, the park lock actuator 8 produces a pushing-in stroke of the park rod and thereby achieves the park lock of the wheels 1 with operation of park lock mechanism 7.

In this case, the park lock controller 9 delivers a parking (P) position signal, as the request shift position signal, to electric motor controller 4. In response to this parking (P) position signal, the electric motor controller 4 can reduce the target motor torque for inverter 6 to zero, and thereby bring the vehicle in the parking state in combination with the above-mentioned operation of park lock mechanism 7.

When the vehicle driving system (electric motor controller 4) is shut down by turning off the ignition switch 11, the park lock controller 9 operates the park lock mechanism 7 in the above-mentioned manner, and thereby sets the vehicle in the parking state for safety even if the park lock switch 12p on the shifter operating member 12a is not pressed. When the vehicle is brought into the parking state, the electric motor controller 4 turns off the power switch 21 of FIG. 1 and thereby brings all the power systems to the open state.

When the driver shifts the operating member 12a from the home (H) position to a neutral (N) position laterally as shown by an arrow α in hope of a stopping state of the vehicle, the shifter 12 delivers the shift position signal indicating the neutral (N) position to park lock controller 9. When operating member 12a is released by the driver, the operating member 12a returns automatically from the neutral (N) position to the home (H) position, and the shifter 12 starts supplying the shift position signal indicating the home (H) position, to park lock controller 9.

In the case of these operations, the park lock controller 9 responds to the shift position signal of the neutral (N) position delivered from shifter 12 at the time of shift of operating member 12a from the home (H) position to the neutral (N) position, and thereby delivers the request shift position signal of the neutral (N) position, to electric motor controller 4. In response to the request shift position signal of the neutral (N) position, the electric motor controller 4 delivers a stopping command (target motor torque=0) for stopping the vehicle, to inverter 6 and thereby allows the vehicle to stop. In this case, park lock controller 9 continues supplying the park lock on command to park lock actuator 8, and thereby holds the wheels 1 in the park lock state.

When the driver shifts the operating member 12a from the home (H) position to a forward drive (D) position as shown by an arrow β, rearwards along an L-shaped path in hope of the forward drive of the vehicle, the shifter 12 delivers the shift position signal indicating the forward drive (D) position to park lock controller 9. When operating member 12a is released by the driver, the operating member 12 returns automatically from the forward drive (D) position to the home (H) position, and the shifter 12 starts supplying the shift position signal indicating the home (H) position, to park lock controller 9.

In the case of these operations, the park lock controller 9 responds to the shift position signal of the forward drive (D) position delivered from shifter 12 at the time of shift of operating member 12a from the home (H) position to the forward drive (D) position. Thereby, park lock controller 9 delivers the park lock OFF command to park lock actuator 8 on the condition that the foot brake signal is in the state indicating the progress of the foot brake operation, and simultaneously delivers the request shift position signal of the forward drive (D) position, to electric motor controller 4.

In this case, in response to the park lock OFF command, the park lock actuator 8 produces the pulling out stroke of the park rod and thereby brings the wheels 1 to a driving rotatable state by removing the park lock.

In response to the request shift position signal of the forward drive (D) position, the electric motor controller 4 delivers a command for the forward rotation and the target motor torque, to inverter 6 and thereby allows the vehicle to move forwards. For calculation of the target motor torque, the electric motor controller 4 receives the signal from a vehicle speed sensor 13 sensing a vehicle speed VSP which is a ground speed of the vehicle, and the signal from an accelerator opening sensor 14 sensing an accelerator opening degree APO which is a driver's request load to electric motor 2.

From the sensed vehicle speed VSP and sensed accelerator opening degree APO, the electric motor controller 4 calculates the request driving force required under the current operating condition, and determines a motor torque capable of realizing this request driving force, as the target motor torque. Electric motor controller 4 produces a PWM signal to control electric motor 2 to achieve the thus-determined target motor torque, and produces a drive signal of inverter 6 through a drive circuit in accordance with this PWM signal.

Inverter 6 has a structure including two switching elements (power semiconductor devices such as IGBTs) for each phase, for example. Inverter 6 converts the dc current supplied from battery 5 to ac current and supplies the current corresponding to the target motor torque, to the electric motor 2, by turning on/off the switching elements in response to the PWM signal.

When the driver shifts the operating member 12a from the home (H) position to a reverse (R) position as shown by an arrow Y forward along an L-shaped path in hope of the reverse drive of the vehicle, the shifter 12 delivers the shift position signal indicating the reverse (R) position to park lock controller 9. When operating member 12a is released by the driver, the operating member 12 returns automatically from the reverse (R) position to the home (H) position, and the shifter 12 starts supplying the shift position signal indicating the home (H) position, to park lock controller 9.

In the case of these operations, the park lock controller 9 responds to the shift position signal of the reverse (R) position delivered from shifter 12 at the time of shift of operating member 12a from the home (H) position to the reverse (R) position. Thereby, park lock controller 9 delivers the park lock OFF command to park lock actuator 8 on the condition that the foot brake signal is in the state indicating the progress of the foot brake operation, and simultaneously delivers the request shift position signal of the reverse (R) position, to electric motor controller 4.

In this case, in response to the park lock OFF command, the park lock actuator 8 produces the pulling out stroke of the park rod and thereby brings the wheels 1 to the driving rotatable state by removing the park lock. In response to the request shift position signal of the reverse (R) position, the electric motor controller 4 delivers a command for the reverse rotation and the target motor torque, to inverter 6 and thereby allows the vehicle to move rearwards. The target motor torque at the time of the reverse drive can be determined in the same manner as the target motor torque for the forward drive, as mentioned before.

<Power Supply Failure Time Safety Measures Control>

Figure 3:
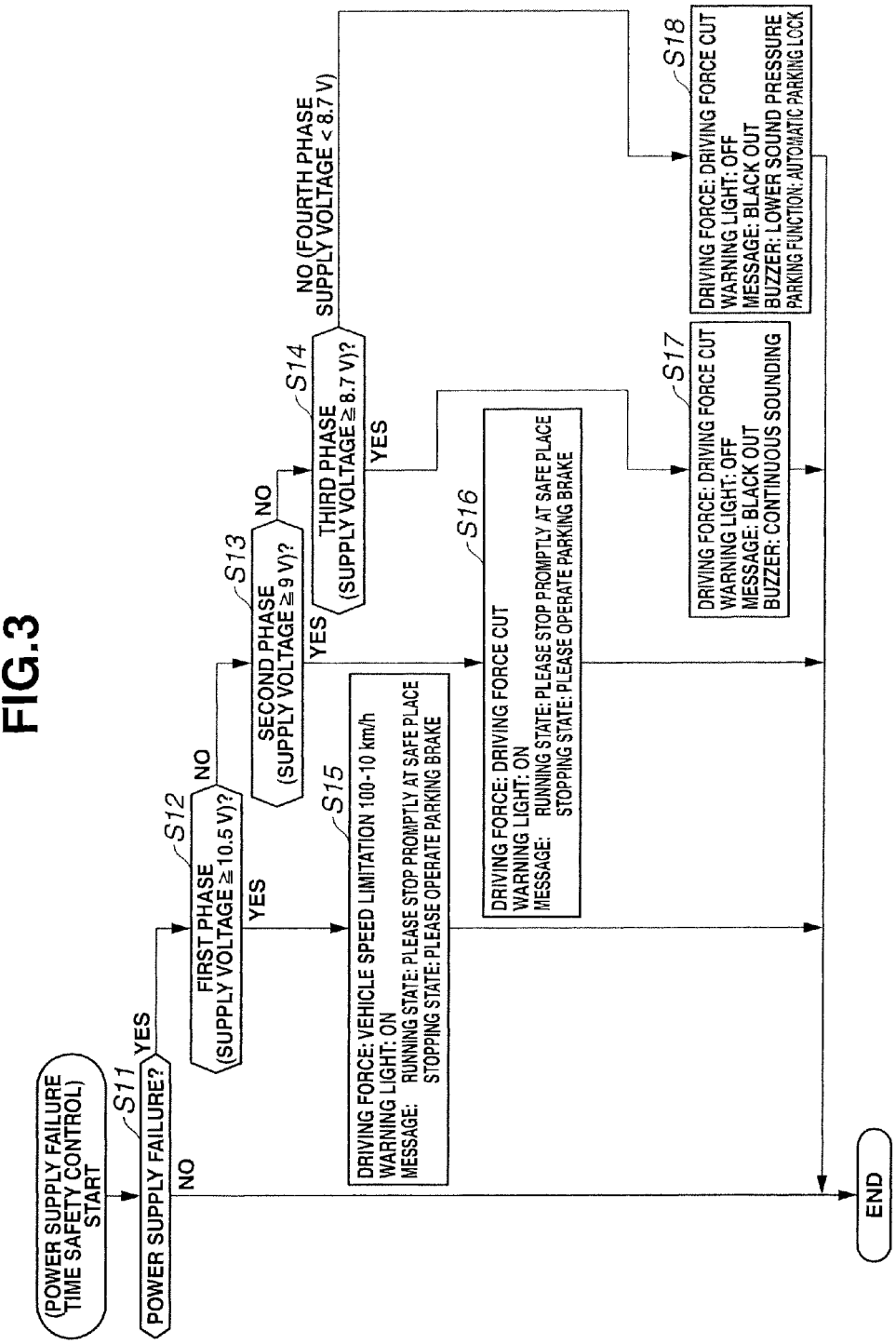
FIG. 3 is a flowchart showing a power supply failure time safety measures control program performed by an electric motor controller and a park lock controller shown in FIG. 2.

Electric motor controller 4 and park lock controller 9 performs a program shown in FIG. 3 and thereby performs a power supply failure time safety measures control intended according to the present invention, based on a logic illustrated in FIG. 4, in a following manner.

First, explanation is given about problem at the time of a power supply failure requiring a safety measures control. In this embodiment, the park lock device is of the by-wire control type arranged to be operated with electric power from the light electric battery 22 shown in FIG. 1. Therefore, if light electric battery 22 falls in a charge inability state unable to charge the battery or a charge malfunction state unable to charge the battery sufficiently, the system becomes unable to lock the left and right front wheels 1FL and 1FR for park lock to the disadvantage of safety at the time when the electric storage state of light electric battery 22 degrades to a storage level unable to guarantee the operation of the park lock device.

Moreover, instead of the mechanical parking brake operated mechanically by the driver, the parking brake of this embodiment is the electric parking brake operated by operating a nearby switch through parking brake controller 24 and parking brake actuator 25 shown in FIG. 1, and the parking brake controller 24 and parking brake actuator 25 are operated with power from light electric battery 22 as the power source of the park lock device. Therefore, at the time of a failure of the park lock device due to a failure of light electric battery 22, the parking brake too becomes unable to function, and the driver becomes unable to park the vehicle.

In this embodiment, therefore, the electric motor controller 4 and park lock controller 9 performs the power supply failure time safety measures control based on the logic of FIG. 4 by performing the control program shown in FIG. 3, and thereby finishes the park lock of left and right front wheels 1FL and 1FR with the operation of the park lock device at the time of a failure of the light electric battery 22 before the electric storage state is decreased to a storage level unable to operate the park lock device.

At a step S11, the control system checks whether the park lock power supply in the form of the light electric battery 22 is in a state of a power supply failure including charge inability and charge malfunction. Step S11 corresponds to a power supply failure detecting means, device or section in the present invention.

The power supply failure can be examined in a following manner since the light electric battery 22 is charged with electric power from heavy electric battery 5 as explained with reference to FIG. 1, and this charging operation is controlled through DC/DC converter 32 by electric motor controller 4 in the state in which power switch 21 is turned on.

(1) The judgment of the power supply failure state is made when light electric battery 22 itself falls into a state incapable of accepting charging or a state continuing degradation of the electric storage state despite charging.

(2) The judgment of the power supply failure state is made when heavy electric battery 5 itself falls into a state incapable of functioning properly for charging the light electric battery 22 or a state limiting the charging operation to light electric battery 22.

(3) The judgment of the power supply failure state is made when power switch 21 falls in an OFF stuck state in which power switch 21 becomes stuck in the OFF state and unable to turn to the ON state.

(4) The judgment of the power supply failure state is made when the DC/DC converter 23 falls in a state unable to charge the light electric battery 22, or a state limiting the charging operation to light electric battery 22, due to failure of DC/DC converter 23.

(5) The judgment of the power supply failure state is made when the electric motor controller falls in a state unable to charge the light electric battery 22 or a state limiting the charging operation to light electric battery 22, due to failure of electric motor controller.

The above-mentioned (3)~(5) can be arranged together as a cause of a charge control system provided between heavy electric battery 5 and light electric battery 22, for charging the light electric battery 22. Accordingly, it can be said that the judgment of the power supply failure state is made when the charge control system fails or falls in an abnormal state.

When the judgment at S11 is that there is no power supply failure state (light electric battery 22 is not in the abnormal state of charge inability or charge malfunction), the control is ended directly since there is no need for the power supply failure time safety measure control according to the present invention.

When the judgment at S11 is the existence of the power supply failure state (light electric battery 22 is in the abnormal state of charge inability or charge malfunction), steps S12~S14 are used to examine the voltage (the electric storage state) of light electric battery 22 on or after the time of the power supply failure, and checks which of first through fourth phases shown in FIG. 4, a decrease of this voltage (the electric storage state) proceeds to. Steps S12~S14 correspond to an electric storage state examining or judging means, device or section in the present invention.

Following is Explanation on Each Phase.

The first phase indicates a process of the voltage of light electric battery 22 decreasing from a voltage at the time of power supply failure to a voltage which is equal to 10.5V, for example. The voltage of 10.5V, for example, is a predetermined voltage determined on the basis of a following ground.

The electric vehicle of this embodiment is arranged to provide assistance to the braking force of the foot brake produced at the time of depression of the brake pedal, by the use of electric power from light electric battery 22, and to provide assistance to the steering force at the time of steering operation of the steering wheel, by the use of electric power from light electric battery 22. Therefore, if the voltage of light electric battery 22 decreases largely, the system becomes unable to provide these assistances or becomes unable to produce a normal or regular assisting force at least. As a result, the brake system requires a great brake pedal depressing effort, and the driver becomes unable to depress the brake pedal even with a greatest possible depressing force and to decelerate the vehicle. This unusual state of the brake pedal may be called an ion plate brake state. Simultaneously, the steering system requires a great effort to turn the steering wheel and the driver becomes unable to operate the steering wheel in a usual manner. Thus, the driver encounters unusual phenomena and it becomes difficult to decrease the vehicle speed safely and to stop the vehicle.

In this embodiment, 10.5V is set as the voltage of light electric battery 22 just before such a situation is reached. The voltage of 10.5V corresponds to a voltage in the vicinity of a lower limit voltage of light electric battery 22 enabling the driver to decelerate the vehicle safely and to stop the vehicle with the above-mentioned regular assistance to the braking force and the above-mentioned regular assistance to the steering force. This voltage is different depending on the vehicle, from vehicle to vehicle.

Such a consideration is required in a vehicle speed range from a maximum vehicle speed (140 km/h in this embodiment) to a vehicle speed about 80 km/h. Accordingly, it is optional to add this vehicle speed range (140 km/h~80 km/h) as shown in FIG. 4, to the condition of the first phase, according to the need.

The second phase indicates a process of the voltage of light electric battery 22 decreasing from the lower limit voltage 10.5V of the first phase, to a voltage of 9V, for example. The voltage of 9V corresponds to a voltage of light electric battery 22 just before the above-mentioned assistance to the braking force and the above-mentioned assistance to the steering force are lost. Accordingly, in the second phase in which the voltage of light electric battery 22 decreases from 10.5V to 9V, the assistances to the braking force and the steering force are decreased gradually, and finally reduced to almost zero. According to the need, it is optional to add a vehicle speed range of 80 km/h to 0 km/h, to the condition of the second phase, as shown in FIG. 4.

The third phase indicates a process of the voltage of light electric battery 22 decreasing from the lower limit voltage 9V of the second phase, to a voltage of 8.7V, for example. This voltage of 8.7V corresponds to a voltage obtained by adding a margin to a lower limit voltage of light electric battery 22 to guarantee the operation of the park lock device (park lock actuator 8 and park lock controller 9). In the third phase in which the voltage of light electric battery 22 decreases from 9V to 8.7V, it becomes unfeasible to operate a warning lamp or light 15a and to display a waning message or alarm message 15b provided in a meter unit 15 shown in FIG. 2. Therefore, in the third phase, the warning lamp 15a turns off, and at the same time, the waning message 15b blacks out, and disappears. According to the need, it is optional to add a vehicle speed range of about 10 km/h to 0 km/h, to the condition of the third phase, as shown in FIG. 4.

The fourth phase indicates a process of the voltage of light electric battery 22 being lower than the lower limit voltage 8.7V of the third phase. This fourth phase indicates the voltage in a lowest voltage range in which light electric battery 22 can barely operate the park lock device (park lock actuator 8 and park lock controller 9). In the fourth phase in which the voltage of light electric battery 22 is lower than 8.7V, the sound pressure level of a buzzer 15c provided in meter unit 15 shown in FIG. 2 decreases with decrease of the voltage of light electric battery 22. As shown in FIG. 4, a vehicle speed range of about 5 km/h to 0 km/h, allowing the wheel lock of the park lock mechanism, is added to the condition of the fourth phase, as shown in FIG. 4.

At a step S12 shown in FIG. 3, the control system checks whether the voltage of light electric battery 22 is in the first phase of decrease from the voltage at the time of detection of power supply failure to 10.5V. At a step S13, the control system checks whether the voltage of light electric battery 22 is in the second phase of decrease from the lower limit voltage of the first phase, that is 10.5V, to 9V. At a step S14, the control system checks whether the voltage of light electric battery 22 is in the third phase of decrease from the lower limit voltage of the second phase, that is 9V, to 8.7V. When the judgment at S14 is that the voltage of light electric battery 22 is not in the third phase of decrease from the lower limit voltage 9V of the second phase, to 8.7V, then the control system judges that the voltage of light electric battery 22 is lower than 8.7V and hence the voltage of light electric battery 22 is in the fourth phase.

[First Phase]

When the judgment at step S12 is the first phase, the control system transfers the control to a step S15 and performs following power failure time safety measures (1)~(4), as shown in FIG. 4, since the voltage of light electric battery 22 is still in a voltage state capable of decreasing the vehicle speed safely with the regular assistance to the braking force of the foot brake and the regular assistance to the steering force, to stoppage of the vehicle.

(1) The control system performs a vehicle speed limiting control to control the driving forces of left and right front wheels 1FL and 1FR through the torque control of electric motor 2 under the control of electric motor control 4, to limit the vehicle speed V to prevent the vehicle speed from exceeding an upper limit vehicle speed set within a range of 100 km/h~10 km/h. Accordingly, step S15 corresponds to a vehicle speed limiting means, device or section according to the present invention.

The upper limit vehicle speed is set in dependence on the voltage of light electric battery 22. The upper limit vehicle speed is set at a vehicle speed limit value capable of decreasing the vehicle speed safely with the regular assistance to the foot brake braking force and the regular assistance to the steering force, to a stoppage even in the situation of the gradually decreasing voltage of light electric battery 22. In this embodiment, the upper limit vehicle speed is decreased gradually from 100 km/h to 10 km/h as the voltage of light electric battery 22 decreases from the voltage level at the time of detection of power supply failure to 10.5V in the first phase.

(2) Moreover, the control system turns on the warning light 12a in meter unit 15 to warn the driver that the light electric battery 22 is in the power supply failure state of charge inability or charge malfunction, the regular assistances to the foot brake braking force and the steering force will become unobtainable shortly, and the park lock disable state disabling the park lock will follow soon.

(3) Moreover, the control system issues a warning to stop the vehicle promptly by displaying, in the warning or alarm message region 15b in meter unit 15 shown in FIG. 2, a message "Please stop promptly at a safe place." in the case of the running state of the vehicle; and issues a warning to operate the parking brake (parking brake controller 24 and actuator 25) by displaying a message "Please operate the parking brake." if the vehicle is already in the stopping state. Accordingly, step S15 corresponds to a stop warning means, device or section in the present invention.

(4) Though not expressed clearly in step S15, the control system sounds the buzzer 15c in meter unit 15 continuously, and thereby warns the driver audibly that the light electric battery 22 is in the power supply failure state of charge inability or charge malfunction, the regular assistances to the foot brake braking force and the steering force will become unobtainable shortly, and the park lock disable state disabling the park lock will follow soon.

[Second Phase]

When the judgment at step S13 is the second phase, the control system transfers the control to a step S16 and performs following power failure time safety measures (1)~(4), as shown in FIG. 4, since the voltage of light electric battery 22 is in a voltage state incapable of providing the regular assistance to the foot brake braking force and regular assistance to the steering force and incapable of decreasing the vehicle speed safely to stoppage of the vehicle with these lowering assisting forces.

(1) The control system performs a driving force cutting control to cut the driving forces of left and right front wheels 1FL and 1FR by reducing the target motor torque supplied from electric motor controller 4 to inverter 6, to zero, and thereby reducing the output torque of electric motor 2 to zero. Accordingly, step S16 corresponds to a driving force cutting means, device or section according to the present invention.

The control system cuts the driving forces to left and right front wheels 1FL and 1FR forcibly because, with decrease in the voltage of light electric battery 22, the assisting forces to the foot brake braking force and the steering force decrease with time so as to decrease the capability of stopping the vehicle safely, and hence there is a need for decreasing the vehicle speed forcibly and stopping the vehicle for safety.

(2) Moreover, the control system holds the warning light 12a in meter unit 15 in the on state continuously from the first phase to warn the driver that the light electric battery 22 is in the power supply failure state of charge inability or charge malfunction, the regular assistances to the foot brake braking force and the steering force will become unobtainable shortly, and the park lock disable state disabling the park lock will follow soon.

(3) Moreover, the control system issues the warning to stop the vehicle promptly by displaying, in the warning message region 15b in meter unit 15 shown in FIG. 2, the message "Please stop promptly at a safe place." in the case of the running state of the vehicle; and issues the warning to operate the parking brake (parking brake controller 24 and actuator 25) by displaying the message "Please operate the parking brake." if the vehicle is already in the stopping state. Accordingly, step S16 corresponds to a park warning means, device or section in the present invention.

(4) Though not expressed clearly in step S16, the control system continues the continuous sounding of the buzzer 15c in meter unit 15 continuously from the first phase, and thereby warns the driver audibly that the light electric battery 22 is in the power supply failure state of charge inability or charge malfunction, the regular assistances to the foot brake braking force and the steering force will become unobtainable shortly, and the park lock disable state disabling the park lock will follow soon.

[Third Phase]

When the judgment at step S14 is the third phase, the control system transfers the control to a step S17 and performs following power failure time safety measures (1)~(4), as shown in FIG. 4, since the voltage of light electric battery 22 is in a voltage state incapable of providing the assistance to the foot brake braking force and assistance to the steering force and increasing the difficulty of decreasing the vehicle speed to stoppage, further as compared to the difficulty in the second phase.

(1) The control system continues the driving force cutting control to cut the driving forces of left and right front wheels 1FL and 1FR by reducing the target motor torque supplied from electric motor controller 4 to inverter 6, to zero, and thereby reducing the output torque of electric motor 2 to zero, continuously from the second phase. Accordingly, step S17 corresponds to the driving force cutting means, device or section according to the present invention.

The control system cuts the driving forces to left and right front wheels 1FL and 1FR forcibly because the control system cannot assist the foot brake braking force and the steering force by using the voltage of light electric battery 22, and the difficulty of decelerating and stopping the vehicle is greater than the second phase, and hence there is a need for decreasing the vehicle speed forcibly.

(2) The warning light 12*a* in meter unit 15 turns from the on state in the second phase to the off state because the voltage of light electric battery 22 becomes too low to turn on the warning light. Therefore, the driver can know that that the voltage of light electric battery 22 decreases to a level just before the incapability of the park lock device.

(3) The alarm message region 15*b* in meter unit 15 shown in FIG. 2 blacks out and the message disappears because of the voltage decrease of light electric battery 22. Therefore, the driver can know that that the voltage of light electric battery 22 decreases to a level just before the incapability of the park lock device.

(4) The control system continues the continuous sounding of the buzzer 15*c* in meter unit 15 continuously from the second phase, and thereby warns the driver audibly the above-mentioned situation.

[Fourth Phase]

When the judgment at step S14 is the fourth phase, the control system transfers the control to a step S18 and performs following power failure time safety measures (1)~(5), as shown in FIG. 4, since the voltage of light electric battery 22 has decreased to a level just before the incapability of the park lock device.

(1) The control system continues the driving force cutting control to cut the driving forces of left and right front wheels 1FL and 1FR by reducing the target motor torque supplied from electric motor controller 4 to inverter 6, to zero, and thereby reducing the output torque of electric motor 2 to zero, continuously from the third phase. Accordingly, step S 18 corresponds to the driving force cutting means, device or section according to the present invention. The control system cuts the driving forces to left and right front wheels 1FL and 1FR forcibly because there is a need for decreasing the vehicle speed forcibly to stoppage for the same reason explained in the third phase.

(2) The warning light 12*a* in meter unit 15 remains in the off state continuously from the third phase because of the voltage decrease of light electric battery 22 to a level too low to turn on the warning light. Therefore, the driver can know that that the voltage of light electric battery 22 decreases to a level just before the incapability of the park lock device.

(3) The alarm message region 15*b* in meter unit 15 shown in FIG. 2 remains in the black-out state continuously from the third phase because of the voltage decrease of light electric battery 22. Therefore, the driver can become aware of the decrease of the voltage of light electric battery 22 to a level just before the incapability of operating the park lock device.

(4) The control system continues the continuous sounding of the buzzer 15*c* in meter unit 15 continuously from the third phase. However, the level of sound pressure of buzzer 15*c* lowers because of the voltage decrease of light electric battery 22, and therefore the driver can become aware audibly of the decrease of the voltage of light electric battery 22 to the level just before the incapability of operating the park lock device.

(5) Furthermore, when the vehicle speed decreases into a park lock enabling region of 5 km/h~0 km/h enabling the wheel rotation lock with the park lock mechanism 7, the park lock controller 9 issues the park lock on command to park lock actuator 8, and thereby operates the park lock mechanism 7, so that the left and right front wheels 1FL and 1FR are brought into the park lock state. Accordingly, step S18 corresponds to a park lock means, device or section.

Operations and Effects

With the power supply failure time safety measures control shown in FIGS. 3 and 4, the control system performs the above-mentioned safety measures in accordance with a decreasing condition of the voltage of light electric battery 22 (the electric storage state) on or after the time of a power supply failure (step S12~step S14) when the light electric battery 22 falls in the power supply failure of charge inability or charge malfunction (step S11). By so doing, the control system can provide following operations and effects.

[First Phase]

In the first phase in which the voltage of light electric battery 22 is still in the voltage state capable of decreasing the vehicle speed safely with the regular assistance to the braking force of the foot brake and the regular assistance to the steering force, to stoppage of the vehicle, the control system performs following safety measures operations at step S15.

(1) The control system limits the vehicle speed V to prevent the vehicle speed from exceeding the upper limit vehicle speed determined in accordance with the voltage of light electric battery 22 for the above-mentioned purpose.

(2) The control system turns on the warning light 12*a*, and thereby warns the driver that, because of the power supply failure state, the regular assistances to the foot brake braking force and the steering force will become unobtainable shortly, and the park lock disable state disabling the park lock will follow soon.

(3) Moreover, the control system issues the warning to stop the vehicle immediately by displaying, in the warning message region 15*b*, the message "Please stop the vehicle promptly at a safe place.".

(4) The control system sounds the buzzer 15*c* continuously, and thereby warns the driver audibly that, because of the power supply failure state, the regular assistances to the foot brake braking force and the steering force will become unobtainable shortly, and the park lock disable state disabling the park lock will follow soon.

First, with the vehicle speed limitation of (1), the control system makes it possible to decrease the vehicle speed and stop the vehicle with the regular assistances while the regular assistance to the foot brake braking force and the regular assistance to the steering force are still obtainable. Second, with the turn-on of warning light 12a at (2), the driver can know, in advance, the assist incapability of the foot brake braking force, the assist incapability of the steering force and the park lock incapability due to the power supply failure. With the alarm message in the alarm message region 15b at (3) "Please stop promptly at safe place.", the driver can promptly know an operation to be operated by the driver, and stop the vehicle without panic. With the continuous sounding of buzzer 15c at (4), the driver can audibly know, in advance, the assist incapability of the foot brake braking force, the assist incapability of the steering force and the park lock incapability due to the power supply failure.

[Second Phase]

In the second phase where the voltage of light electric battery 22 is in the voltage region incapable of providing the regular assistance to the foot brake braking force and regular assistance to the steering force and hence the capability of decreasing the vehicle speed safely to stoppage of the vehicle with these lowering assisting forces is decreasing, the control system performs following control operations at step S16.

(1) The control system performs the driving force cutting control to cut the driving forces of left and right front wheels 1FL and 1FR by electric motor 2.

(2) Moreover, the control system holds the warning light 12a in the on state continuously from the first phase, and thereby warns the driver that, because of the power supply failure, the regular assistances to the foot brake braking force and the steering force will become unobtainable shortly, and the park lock disable state disabling the park lock will follow soon.

(3) Moreover, the control system displays, in the warning message region 15b, the message "Please stop promptly at a safe place." in the case of the running state and the message "Please operate the parking brake." in the case of the stopping state. By so doing, the control system issues the warning to stop the vehicle immediately and to operate the parking brake (parking brake controller 24 and actuator 25).

(4) The control system continues the continuous sounding of the buzzer 15c continuously from the first phase, and thereby warns the driver audibly that, because of the power supply failure, the regular assistances to the foot brake braking force and the steering force will become unobtainable shortly, and the park lock disable state disabling the park lock will follow soon.

First, with the driving force cutting control of (1), the control system can decrease the vehicle speed forcibly and stop the vehicle. Thus, the control system can prevent continuation of the vehicle driving operation without decreasing the vehicle speed in spite of the situation in which the assistances to the foot brake braking force and the steering force become lower with decrease of the voltage of light electric battery 22, and it is becoming difficult to stop the vehicle safely. Second, with the turn-on of warning light 12a at (2), the driver can know, in advance, the assist incapability of the foot brake braking force, the assist incapability of the steering force and the park lock incapability due to the power supply failure. With the alarm messages in the alarm message region 15b at (3) "Please stop promptly at safe place." and "Please operate the parking brake.", the driver can promptly know an operation to be operated by the driver, and stop the vehicle to the parking state, without panic. With the continuous sounding of buzzer 15c at (4), the driver can audibly know, in advance, the assist incapability of the foot brake braking force, the assist incapability of the steering force and the park lock incapability due to the power supply failure.

[Third Phase]

In the third phase where the voltage of light electric battery 22 is in the voltage state incapable of providing the assistance to the foot brake braking force and assistance to the steering force and increasing the difficulty of decreasing the vehicle speed to stoppage and parking, further as compared to the difficulty in the second phase, the control system performs the following operation at step S17.

(1) The control system continues the driving force cutting control from the second phase.

(2) The warning light 12a is turned off because of the voltage decrease of light electric battery 22.

(3) The alarm message region 15b blacks out and the message disappears because of the voltage decrease of light electric battery 22.

(4) The buzzer 15c is sounded continuously from the second phase.

First, with the driving force cutting control of (1), the control system can decrease the vehicle speed forcibly and stop the vehicle. Thus, the control system can prevent continuation of the vehicle driving operation without decreasing the vehicle speed in spite of the situation in which the assistances to the foot brake braking force and the steering force become lost with decrease of the voltage of light electric battery 22, and it is becoming difficult to stop the vehicle safely.

Second, with the turn-off of warning light 12a at (2), the driver can know, in advance, that the voltage of light electric battery 22 has decreased to a level just before the incapability of the park lock device. With the black out of the alarm message region 15b at (3), the driver can know, in advance, that the voltage of light electric battery 22 has decreased to the level just before the incapability of the park lock device. With the continuous sounding of buzzer 15c at (4), the driver can know, in advance, that the voltage of light electric battery 22 has decreased to the level just before the incapability of the park lock device.

[Fourth Phase]

In the fourth phase in which the voltage of light electric battery 22 has decreased to the level just before the incapability of the park lock device, the control system performs the following operation at step S18.

(1) The control system continues the driving force cutting control, continuously from the third phase.

(2) The warning light 12a remains in the off state continuously from the third phase because of the voltage decrease of light electric battery 22.

(3) The alarm message region 15b remains in the black-out state continuously from the third phase because of the voltage decrease of light electric battery 22.

(4) The control system continues the continuous sounding of the buzzer 15c continuously from the third phase. However, the level of sound pressure of buzzer 15c lowers because of the voltage decrease of light electric battery 22.

(5) Furthermore, when the vehicle speed is in the park lock enabling region of 5 km/h~0 km/h, the control system operates the park lock mechanism 7, and thereby sets the left and right front wheels 1FL and 1FR in the park lock state.

First, with the driving force cutting control of (1), the control system can bring the vehicle speed to a stop reliably. Second, with the turn-off of warning light 12a at (2), the driver can know, in advance, that the voltage of light electric battery 22 has decreased to the level just before the incapability of the park lock device. With the black out of the alarm message region 15b at (3), the driver can know, in advance, that the voltage of light electric battery 22 has decreased to the level just before the incapability of the park lock device. With the decrease of sound pressure of the continuous sounding of buzzer 15c at (4), the driver can know, in advance, that the voltage of light electric battery 22 has decreased further as compared to the third phase. With the park lock control at (5), the control system can set the left and right front wheels 1FL and 1FR in the park lock state.

This park lock operation ends just before the decrease of voltage of light electric battery 22 to such a low level incapable of operating the park lock mechanism 8. Therefore, even if the voltage of light electric battery 22 is decreased by a power supply failure to a low level incapable of actuating the park lock device, the control system can complete the park lock operation of left and right front wheels 1FL and 1FR with the remaining voltage of light electric battery 22 remaining before the decrease to the low voltage incapable of actuating the park lock device. Thus, the control system can avoid a situation unable to park the vehicle at the time of power supply failure.

Moreover, the control system can achieve the above-mentioned operations and effects to avoid the parking disabling state at the time of power supply failure, inexpensively without the need for employing two power supply systems including the light electric battery 22, only by employing measures, on the control, of detecting a power supply failure such as charge inability or charge malfunction in the light electric battery 22 (step S11); examining or judging the voltage (the electric storage state) of the light electric battery 22 at and after the time of the power supply failure; and operating the park lock mechanism 7 (S18) when this voltage approaches a lower voltage limit ensuring the operation of the park lock mechanism 7 (step S14).

Further Embodiments

In the preceding embodiment, the electric storage state is judged by monitoring the voltage of light electric battery 22 (steps S12~S14).

This method of judging the electric storage state (the first through fourth phases) is direct and accurate. However, this method is not a limitative example. For example, it is possible to grasp the voltage of light electric battery 22 on and after the time of a power supply failure by monitoring an elapsed time from a time t1 of a power supply failure, since, on and after the time of a power supply failure, the decrease of voltage of light electric battery 22 is determined approximately by the elapsed time from the time t1 of the power supply failure, as shown by solid lines in FIGS. 5A~5D, as an example.

Therefore, it is possible to judge the first through fourth phases in a following manner. Before the judgment, the decreasing pattern or tendency of voltage of light electric battery 22 on and after the time of a power supply failure is determined by actual measurement, and the results of the measurement is arranged in the form of data as shown by the solid lines in FIGS. 5A~5D. Then, first, second and third phase judgment time periods Δt1, Δt2 and Δt3 are determined preliminarily. The first phase judgment time period Δt1 is a period of time from the time t1 of a power supply failure at which the voltage of light electric battery 22 is equal to a rated voltage, to a time t2 at which the voltage is decreased from the rated voltage at t1, to the above-mentioned voltage of 10.5V. The second phase judgment time period Δt2 is a period of time from the time t2 to a time t3 during which the voltage of light electric battery 22 decreases from 10.5V to the above-mentioned voltage of 9V. The third phase judgment time period Δt3 is a period of time from the time t3 to a time t4 during which the voltage of light electric battery 22 decreases from 9V to the above-mentioned voltage of 8.7V.

In the judgment of the first phase, the control system monitors the elapsed time from the time t1 of detection of a power supply failure (step S11), and makes the judgment of the first phase while the elapsed time is within the first phase judgment time period Δt1, as shown in FIG. 5A. In the judgment of the second phase, the control system monitors the elapsed time from the time t2 which is the instant at which the first phase judgment time period Δt1 ends, and makes the judgment of the second phase while the elapsed time is within the second phase judgment time period Δt2, as shown in FIG. 5B. In the judgment of the third phase, the control system monitors the elapsed time from the time t3 which is the instant at which the second phase judgment time period Δt2 ends, and makes the judgment of the third phase while the elapsed time is within the third phase judgment time period Δt3, as shown in FIG. 5C. In the judgment of the fourth phase, the control system makes the judgment of the fourth phase after the time t4 which is the instant at which the third phase judgment time period Δt3 ends, as shown in FIG. 5D.

When the control system is thus arranged to make the judgment on the first phase~the fourth phase by grasping the voltage (electric storage state) of light electric battery 22 on and after the time of a power supply failure on the basis of the elapsed time from the time of the power supply failure, the system does not require means, such as a sensor, for sensing the voltage (the electric storage state) of light electric battery 22, to the advantage of cost.

The invention claimed is:

1. A vehicular power supply failure time safety measures control apparatus for a vehicle equipped with an electric park lock mechanism to lock rotation of a wheel, the power supply failure time safety measures control apparatus comprising:
   a power supply failure detecting section to detect occurrence of a power supply failure including one of charge inability and charge malfunction in a park lock power supply of the park lock mechanism;
   an electric storage state examining section to examine an electric storage state of the park lock power supply on and after a time of detection of the power supply failure by the power supply failure detecting section; and
   a park lock section to lock rotation of the wheel by operating the park lock mechanism, under a vehicle speed condition allowing rotation lock of the wheel with the park lock mechanism, when the electric storage state of the park lock power supply judged by the electric storage state examining section approaches a lower limit of the electric storage state ensuring operation of the park lock mechanism;
   wherein the park lock power supply includes only one electric power source unit and the park lock section is configured to lock rotation of the wheel by operating the park lock mechanism with electric power of said only one electric power source unit of the park lock power supply, when the electric storage state of the park lock power supply judged by the electric storage state examining section approaches the lower limit of the electric storage state ensuring operation of the park lock mechanism.

2. The vehicular power supply failure time safety measures control apparatus as claimed in claim 1:
   wherein the vehicle is an electrically powered vehicle using an electric motor driven with electric power from a higher voltage power supply as at least part of a power source to move the vehicle, and using, as the park lock power supply, a lower voltage power supply charged with the electric power from the higher voltage power supply; and wherein the power supply failure detecting section is configured to detect one of a failure in the higher voltage power supply, a failure in the lower voltage power supply, and a failure of a charging control system provided between the higher voltage power supply and the lower voltage power supply, for the lower voltage power supply, and thereby to detect the occurrence of the power supply failure including one of the charge inability and the charge malfunction in the park lock power supply.

3. The vehicular power supply failure time safety measures control apparatus as claimed in claim 1, wherein the electric storage state examining section is configured to examine the electric storage state of the park lock power supply by monitoring a voltage of the park lock power supply.

4. A vehicular power supply failure time safety measures control apparatus for a vehicle equipped with an electric park lock mechanism to lock rotation of a wheel, the power supply failure time safety measures control apparatus comprising:

a power supply failure detecting section to detect occurrence of a power supply failure including one of charge inability and charge malfunction in a park lock power supply of the park lock mechanism;

an electric storage state examining section to examine an electric storage state of the park lock power supply on and after a time of detection of the power supply failure by the power supply failure detecting section; and a park lock section to lock rotation of the wheel by operating the park lock mechanism, under a vehicle speed condition allowing rotation lock of the wheel with the park lock mechanism, when the electric storage state of the park lock power supply judged by the electric storage state examining section approaches a lower limit of the electric storage state ensuring operation of the park lock mechanism; and wherein the electric storage state examining section is configured to measure an elapsed time from a time of the detection of the power supply failure by the power supply failure detecting section, and to judge the electric storage state of the park lock power supply from the elapsed time.

5. A vehicular power supply failure time safety measures control apparatus for a vehicle equipped with an electric park lock mechanism to lock rotation of as wheel, the power supply failure the time safety measures control apparatus comprising:

a power supply failure detecting section to detect occurrence of a power supply failure including one of charge inability and charge malfunction in a park lock power supply of the park lock mechanism;

an electric storage state examining section to examine an electric storage state of the park lock power supply on and after a time of detection of the power supply failure by the power supply failure detecting section; and a park lock section to lock rotation of the wheel by operating the park lock mechanism, under a vehicle speed condition allowing rotation lock of the wheel with the park lock mechanist, when the electric storage state of the park lock power supply judged by the electric storage state examining section approaches a lower limit of the electric storage state ensuring operation of the park lock mechanism;

wherein the vehicle is arranged to use the electric power from the park lock power supply to assist a braking force; and wherein the vehicular power supply failure time safety measures control apparatus further comprises a vehicle speed limiting section to limit a vehicle speed to prevent the vehicle speed from being increased beyond an upper limit speed by a driving force control of the wheel while the electric storage state of the park lock power supply judged by the electric storage state examining section is in a region capable of stopping the vehicle with a regular assistance for the braking force.

6. The vehicular power supply failure time safety measures control apparatus as claimed in claim 5, wherein the vehicle speed limiting section is configured to set the upper limit speed to a vehicle speed value capable of stopping the vehicle with the regular assistance for the braking force even in the above-mentioned electric storage state, in accordance with the electric storage state of the park lock power supply judged by the electric storage state examining section.

7. The vehicular power supply failure time safety measures control apparatus as claimed in claim 5, wherein the vehicular power supply failure time safety measures control apparatus further comprises a stop warning section to produce a warning to indicate a stop of the vehicle while the electric storage state of the park lock power supply judged by the electric storage state examining section is in the region capable of stopping the vehicle with the regular assistance for the braking force.

8. The vehicular power supply failure time safety measures control apparatus as claimed in claim 5, wherein the vehicle is arranged to use the electric power from the park lock power supply to assist a braking force; and wherein the vehicular power supply failure time safe measures control apparatus further comprises a driving force cutting section to reduce a driving force of the wheel to zero after the electric storage state of the park lock power supply judged by the electric storage state examining section enters a region incapable of stopping the vehicle with a regular assistance for the braking force.

9. A vehicular power supply failure time safety measures control apparatus for a vehicle equipped with an electric park lock mechanism to lock rotation of a wheel, the power supply failure time safety measures control apparatus comprising:

a power supply failure detecting section to detect occurrence of a power supply failure including one of charge inability and charge malfunction in a park lock power supply of the park lock mechanism;

an electric storage state examining section to examine an electric storage state of the park lock power supply on and after a time of detection of the power supply failure by the power supply failure detecting section; and a park lock section lock rotation of the wheel by operating the park lock mechanism, under a vehicle speed condition allowing rotation lock of the wheel with the park lock mechanism, when the electric storage state of the park lock power supply judged by the electric storage state examining section approaches a lower limit of the electric storage state ensuring operation of the park lock mechanism;

wherein the vehicle is arranged to use the electric power from the park lock power supply to assist a braking force; and wherein the vehicular power supply failure time safety measures control apparatus further comprises a driving force cutting section to reduce a driving force of the wheel to zero after the electric storage state of the park lock power supply judged by the electric storage state examining section enters a region incapable of stopping the vehicle with a regular assistance for the braking force.

10. The vehicular power supply failure time safety measures control apparatus as claimed in claim 9, wherein the vehicular power supply failure time safety measures control apparatus further comprises a park warning section to indicate stoppage of the vehicle and application of a parking brake after the electric storage state of the park lock power supply judged by the electric storage state examining section enters the region incapable of stopping the vehicle with the regular assistance for the braking force.

11. A vehicular power supply failure time safety measures control apparatus for a vehicle equipped with an electric park lock mechanism to lock rotation of a wheel, the power supply failure time safety measures control apparatus comprising:
a power supply failure detecting section to detect occurrence of a power supply failure including one of charge inability and charge malfunction in a park lock power supply of the park lock mechanism;
an electric storge state examining section to examine an electric storage state of the park lock power supply on and after a time of detection of the power supply failure by the power supply failure detecting section; and
a park lock section to lock rotation of the wheel by operating the park lock mechanism, under a vehicle speed condition allowing rotation lock of the wheel with the park lock mechanism, when the electric storage state of the park lock power supply judged by the electric storage state examining section approaches a lower limit of the electric storage state ensuring operation of the park lock mechanism;
wherein the vehicular power supply failure time safety measures control apparatus further comprises a stop warning section to prompt a driver of the vehicle to stop the vehicle immediately in a running state of the vehicle upon detection of the power supply failure.

12. A vehicular power supply failure time safety measures control apparatus for a vehicle equipped with an electric park lock mechanism to lock rotation of a wheel, the power supply failure time safety measures control apparatus comprising:
a power supply failure detecting section to detect occurrence of a power supply failure including one of charge inability and charge malfunction in park lock power supply of the park lock mechanism;
an electric storage state examining section to examine an electric storage state of the park lock power supply on and after a time of detection of the power supply failure by the power supply failure detecting section; and
a park lock section to lock rotation of the wheel by operating the park lock mechanism, under a vehicle speed condition allowing rotation lock of the wheel with the park lock mechanism, when the electric storage state of the park lock power supply judged by the electric storage state examining section approaches a lower limit of the electric storage operation of the park lock mechanism;
wherein
the electric storage state examining section is configured to compare the electric storage state of the park lock power supply after the detection of the power supply failure, with a predetermined threshold level close to the lower limit of the electric storage state ensuring operation of the park lock mechanism; and
the park lock section is configured to perform an automatic park lock control operation to lock rotation of the wheel by operating the park lock mechanism when the electric storage state of the park lock power supply is lower than the predetermined threshold level.

13. The vehicular power supply failure time safety measures control apparatus as claimed in claim 12, wherein the vehicular power supply failure time safety measures control apparatus further comprises a preparing section to perform a preparing control operation to decrease a vehicle speed of the vehicle before the electric storage state of the park lock power supply becomes lower than the predetermined threshold level.

14. The vehicular power supply failure time safety measures control apparatus as claimed in claim 13, wherein the electric storage state examining section is configured to compare the electric storage state of the park lock power supply after the detection of the power supply failure, with a predetermined second level higher than the threshold level and the preparing section is configured to perform a first preparing control operation to prompt a driver of the vehicle to decrease the vehicle speed of the vehicle when the electric storage state of the park lock power supply is higher than or equal to the second level and to perform a second preparing control operation to decrease the vehicle speed automatically when the electric storage state of the park lock power supply is lower than the second level before the electric storage state of the park lock power supply becomes lower than the predetermined threshold level.

15. A vehicular power supply failure time safety measures control apparatus for a vehicle equipped with an electric park lock mechanism to lock rotation of a wheel of the vehicle, the power supply failure time safety measures control apparatus comprising:
a power supply failure detecting section to detect occurrence of a power supply failure of a park lock power supply;
an electric storage state examining section to examine an electric storage state of the park lock power supply after detection of the power supply failure by the power supply failure detecting section, and to discriminate a marginal failure phase in accordance with the electric storage state of the park lock power supply, from a pre-marginal failure phase before the marginal failure phase is reached; and
a control section to perform an automatic park lock operation to lock rotation of the wheel automatically by operating the park lock mechanism with electric power from the park lock power supply when the marginal failure phase is reached, and performing a preparing control operation to decrease a vehicle speed of the vehicle in the pre-marginal failure phase, in preparation of the automatic park lock operation.

16. The vehicular power supply failure time safety measures control apparatus as claimed in claim 15, wherein the electric storage state examining section is configured to divide the pre-marginal failure phase into a first phase and a second phase in accordance with the electric storage state of the park lock power supply after the detection of the power supply failure, and further comprising:
a preparing section configured to perform a first preparing control operation to decrease the vehicle speed by prompting a driver of the vehicle to decrease the vehicle speed in the first phase and to perform a second preparing control operation to decrease the vehicle speed automatically in the second phase, before the marginal failure phase.

* * * * *